United States Patent [19]
Speer et al.

[11] Patent Number: 6,063,446
[45] Date of Patent: May 16, 2000

[54] PROCESS FOR THE PRODUCTION OF DECORATED TABLEWARE WITH INCREASED RESISTANCE TO SCRATCHES CAUSED BY CUTLERY AND COLORING SUBSTANCE THEREFOR

[75] Inventors: Dietrich Speer, Langenselbold; Adalbert Huber, Langen; Kai Dorer, Heusenstamm; Gabriele Wachowitz, Dietzenbach, all of Germany

[73] Assignee: Cerdec Aktiengesellschaft Keramische Farben, Frankfurt, Germany

[21] Appl. No.: 09/166,279

[22] Filed: Oct. 5, 1998

[30] Foreign Application Priority Data

Oct. 4, 1997 [DE] Germany .................. 197 43 851

[51] Int. Cl.⁷ .................................................. B05D 3/02
[52] U.S. Cl. .................................. 427/376.2; 427/419.6
[58] Field of Search ............................ 427/419.6, 376.2; 501/21

[56] References Cited

U.S. PATENT DOCUMENTS

| | | | |
|---|---|---|---|
| 4,446,241 | 5/1984 | Francel et al. | 501/14 |
| 5,194,089 | 3/1993 | Speer et al. | 106/426 |
| 5,238,881 | 8/1993 | Norris et al. | 501/20 |
| 5,326,728 | 7/1994 | Boury et al. | 501/17 |

FOREIGN PATENT DOCUMENTS

| | | |
|---|---|---|
| 0460863 | 12/1991 | European Pat. Off. . |
| 460863 | 12/1991 | European Pat. Off. . |
| 3518523 | 7/1986 | Germany . |
| 4108624 | 9/1992 | Germany . |
| 19709100 | 9/1998 | Germany . |
| 1414813 | 8/1988 | U.S.S.R. . |

OTHER PUBLICATIONS

Völz, "Industrial Color Testing Fundamentals and Techniques", 1995, pp. 132–135.

Ullmann's Enzyklopädie der technischen Chemie, 4th Edition, vol. 14 (1977), pp. 9–10.

*Primary Examiner*—Shrive Beck
*Assistant Examiner*—Michael Barr
*Attorney, Agent, or Firm*—Wenderoth, Lind & Ponack, L.L.P.

[57] ABSTRACT

The resistance of tableware decorations to cutlery abrasion traces can be increased by using, in the production of the decoration, a decoration coloring substance containing a pigment and a glass flux with the characteristics profile according to the invention: the pigment of the decoration coloring substance has an average grain diameter equal to or less than 2 $\mu$m, and the glass flux of the decoration coloring substance has a density equal to or less than 2.6 $g/cm^3$ and a hemisphere temperature less than 930° C.

6 Claims, No Drawings

PROCESS FOR THE PRODUCTION OF DECORATED TABLEWARE WITH INCREASED RESISTANCE TO SCRATCHES CAUSED BY CUTLERY AND COLORING SUBSTANCE THEREFOR

BACKGROUND OF THE INVENTION

The invention relates to a process for the production of decorated ceramic material, for example tableware, with increased resistance to cutlery abrasion traces (scratches) and means for such, wherein this means is a decoration coloring substance with a combination of particular characteristics according to the invention, to be used in the process.

The production of colored decorations on ceramic materials, such as, for example, tableware made of stoneware, bone china and porcelain, is known per se (see Ullmann's Enzyklopädie der technischen Chemie, 4th Edition, Vol. 14 (1977), pp. 9–10). By means of the most diverse application techniques, such as painting, immersion, spraying, and in particular direct or indirect imprinting, a decoration coloring substance is applied in the form of a decoration onto the material to be decorated and subsequently fired in.

Decoration coloring substances comprise substantially a pigment and a glass flux conventionally containing one or more glass frits. In the case of tableware decorations, it is necessary to differentiate between on-glaze and in-glaze decoration. After glaze firing, a decoration is applied onto the tableware part to be decorated, most often by means of direct printing or via indirect printing (transfer pattern technique), and subsequently, in the case of on-glaze decoration, the decoration is baked in during normal firing at approximately 780 to 900° C., or in a high-temperature quick firing, at above 900° C. to approximately 1100° C.; and in the case of an in-glaze decoration, baking is at temperatures in the range from approximately 1100 to 1250° C.

Porcelain tableware, in particular hotel and restaurant porcelain, is subjected to high stress through alkaline wash-water of dish washing machines and through the effect of cutlery during use. Cutlery effects on decorated tableware parts lead to gray abrasion traces which interfere with the aesthetic impression. Such abrasion traces, or scratches, caused by metal cutlery are especially disturbing in large-area decorations which are increasingly in demand by the market. This problem could, until now, only be partially solved through an in-glaze decoration in which the decoration becomes partially submerged in the glaze layer during the firing. As yet, a way of surpassing this practice and preventing the abrasion traces has not become known.

SUMMARY OF THE INVENTION

Accordingly, it is an object of the invention to provide a way of increasing the resistance of the decorations to cutlery abrasion traces.

It has been found that through a special characteristic combination of (i) the mean grain diameter of the pigment, (ii) the density of the flux and (iii) the hemisphere temperature (HSP) of the flux, it is possible to avoid completely, or at least largely, cutlery abrasion traces on decorations fired in the range from 1000 to 1250° C.

Accordingly, the object of the present invention is achieved through a process for the production of decorated ceramic material, for example tableware, with increased resistance to cutlery abrasion traces, comprising the application of a decoration coloring substance comprising a pigment and a glass flux onto the tableware and firing-in of the decoration at a temperature in the range from 1000 to 1250° C., which is characterized in that a decoration coloring substance is used whose pigment has a mean grain diameter $d_{50}$ equal to or less than 2 $\mu$m and whose glass flux has a density equal to or less than 2.6 g/cm$^3$ and a hemisphere temperature of less than 930° C.

DETAILED DESCRIPTION OF THE INVENTION

It is thought that the abrasion traces are caused by pigment crystals projecting from the surface of the baked-in decoration. But the grinding alone of the pigment to $d_{50}$ values equal to or below 2 $\mu$m, even at $d_{90}$ values at or below 5 $\mu$m, in many cases does not lead to a satisfactory increase of the resistance to cutlery abrasion traces. Thus, further measures were required to sufficiently reduce the occurrence of abrasion traces.

A decrease of the occurrence of abrasion traces is attained if, in addition to the use of a finely ground pigment, a glass flux with a density and hemisphere temperature according to the invention as described above is used. A low hemisphere temperature at simultaneous high density does not lead to the desired effect. It is assumed that, through the combination of coloring substance characteristics according to the invention, the pigment particles can sink into the decoration layer, so that the concentration of pigment, which is responsible for the cutlery abrasion and the abrasion traces on the decoration, is low at the decoration surface.

The glass flux substantially comprises one or more glass frits, and with respect to the glass flux density, such compositions are considered which comprise no or only small concentrations of oxides of heavy elements, such as those of barium, lanthanum, lanthanoids, tantalum, lead and bismuth. The flux preferably comprises lead-free glass frits.

The hemisphere temperature of the glass flux, also called hemisphere point (HSP), is associated with the state of the test body, in which the radius of a base area is equal to its height; the determination of the HSP takes place under a heating microscope wherein a cylindrical test body (3 mm diameter and 3 mm height), formed by compressing glass powder, is heated at a constant rate (10° C./min).

The hemisphere temperature is preferably lower than 900° C., in particular equal to or lower than 880° C.

Application of the decoration coloring substance onto the tableware comprises measures known in the art, for example, pasting on the decoration coloring substance, direct or indirect printing, and firing. The decoration is preferably applied onto glazed porcelain and baked in at a temperature in the range from 1000 to 1250° C., in particular 1100 to 1250° C.

The invention also provides decoration coloring substances with the above described combination of characteristics.

A significant advantage of the invention is the high resistance to cutlery abrasion traces so that, even after intensive use, the luster of the decoration of the tableware is entirely or largely retained. A further advantage is that, surprisingly, without reducing the resistance to abrasion traces, the pigment volume concentration (PVC) and, thus, the intensity of the color of the decoration, can be increased (PVC according to H. G. Völz in Industrial Color Testing, VCH, Weinheim (1995), 133–134).

EXAMPLES

General Test Conditions

The test plates to be analyzed were produced as follows:
1. Grinding of the decoration coloring substance in an ethanol/acetone mixture in a Bloch-Rosetti mill—120 minutes, 50 g material to be ground, 150 g grinding balls.
2. Pasting-on of the decoration coloring substance in a printing medium (No. 80820 by Cerdec AG)—10 parts by weight of decoration coloring substance and 6 parts by weight medium.
3. Printing onto transfer pattern paper by means of a 100-mesh Nylon screen; filming.
4. Decorating of porcelain plates by means of transfer patterns.
5. Firing: sliding-bat kiln, 90 minutes, 1140° C., and 1220° C.

Test parameters were (i) the dishwasher resistance and (ii) the resistance to cutlery abrasion (abrasion test):

(i): 500 washing cycles according to DIN 50275 using a cleanser according to DIN 44990. Evaluation: 5=no impairment of luster, 4=slight decrease of luster, 3=slightly dull-bright, 2=dull-bright, 1=stone dull, no luster.

(ii): A blade of chrome steel (18% chromium) is guided 5 times flat scraping over the decoration surface; type and thickness of the metal abrasion are evaluated: 5=no abrasion traces, 4=abrasion traces which can be wiped away, 3=abrasion traces which cannot be completely removed by wiping, 2=strong, nonremovable abrasion traces, 1=very strong, nonremovable abrasion traces.

The table below lists data regarding the glass flux material property denoted as hemisphere temperature or hemisphere point (HSP in ° C.), the density and the main components (in wt. %) of the glass fluxes used in the form of glass frits.

|  | A | B | C | D | E | F | G |
|---|---|---|---|---|---|---|---|
| HSP (° C.) | 810 | 880 | 820 | 450 | 830 | 780 | 940 |
| Density (g/cm$^3$) | 2.47 | 3.34 | 2.53 | 7.78 | 2.93 | 4.75 | 2.51 |
| PbO | 0 | 32.5 | 0 | 82.7 | 24.5 | 66.3 | 0 |
| SiO$_2$ | 55.6 | 41.1 | 50.3 | 2.3 | 46.1 | 33.4 | 59.0 |
| B$_2$O$_3$ | 19.1 | 9.5 | 20.7 | 13.4 | 15.3 | — | 12.0 |
| Al$_2$O$_3$ | 5.6 | 5.5 | 7.6 | — | 5.8 | 0.3 | 9.0 |
| R$_2$O (R = Na, K, Li) | 14.0 | 2.9 | 9.6 | — | 8.1 | — | 10.5 |
| R'O (R' = Ca, Sr, Ba, Zn) | 0.5 | 8.4 | 3.4 | 1.6 | — | — | 9.3 |
| ZrO$_2$ | 4.3 | — | 4.6 | — | — | — | — |

Example 1 (E 1) and Comparison Example 1 (CE 1)

White decoration coloring substances were prepared which comprised as pigment CeO$_2$ with $d_{50}$=1.3 μm, $d_{90}$=4.3 μm and a density of 7.1 g/cm$^3$. The decorations were applied in known manner via transfer patterns onto porcelain plates and fired at 1140° C., and 1220° C. The fluxes used, the pigment volume concentration (PVC) and results of the dishwasher resistance and resistance to cutlery abrasion traces (abrasion tests) are listed in the table below.

|  | E 1 | CE 1 |
|---|---|---|
| PVC (%) | 13 | 11 |
| Flux: Type | A | Mixture of E and F |
| HSP (° C.) | 810 | (ratio of weight 3.8:1) |
| Density (g/cm$^3$) | 2.47 | E = 830, F = 780 |
|  |  | 3.0 |
| Dishwasher resistance *) | 4 / 4 | 2 / 3 |
| Abrasion test *) | 4 / 4 | 2 / 2 |

*) Values at firing temperatures of 1140° C./1220° C.

The comparison tests show that a low value for the HSP alone is not sufficient to avoid abrasion traces to a large extent, but that, in addition, the density of the flux must be below the limit value according to the invention.

Example 2 (E 2) and Comparison Example 2 (CE 2)

White decoration coloring substances were prepared which comprise as the pigment tin oxide with $d_{50}$=0.64 μm, $d_{50}$=7.04 μm and a density of 7.04 g/cm$^3$. The fluxes, PVC and results of the tests after firing at 1140° C./1220° C. are given in the table below.

|  | E 2 | CE 2 |
|---|---|---|
| PVC (%) | 15 | 10 |
| Flux: Type | A | B |
| HSP (° C.) | 810 | 880 |
| Density (g/cm$^3$) | 2.47 | 3.34 |
| Dishwasher resistance *) | 4.5 / 5 | 4.5 / 5 |
| Abrasion test *) | 5 / 5 | 3 / 3 |

*) Firing at 1140, and 1220° C.

Example E 2 shows that, by using a flux with an HSP below 900° C. and a density below 2.6 g/cm$^3$, it is possible to increase the PVC and, thus, the intensity of the decoration, and yet, relative to CE 2, attain an increase of the resistance to cutlery abrasion traces.

Example 3 (E 3) and Comparison Example 3 (CE 3)

Green decoration coloring substances were prepared which comprised as the pigment chromium oxide with $d_{50}$=0.73 μm, $d_{90}$=2.4 μm and a density of 5.2 g/cm$^3$. The table below lists data analogous to Example 1.

|   | E 3 | CE 3 |
|---|---|---|
| PVC (%) | 10 | 10 |
| Flux: Type | A | G |
| HSP (° C.) | 810 | 940 |
| Density (g/cm$^3$) | 2.47 | 2.51 |
| Dishwasher resistance *) | 5 / 5 | 3 / 2 |
| Abrasion test *) | 5 / 5 | 2 / 2 |

*) Firing at 1140, and 1220° C.

Comparison of E 3 with CE 3 shows that the HSP has a strong effect on the resistance to abrasion traces, and specifically also when in the example and comparison example a lead-free frit is used with nearly identical density.

Example 4 (E 4) and Comparison Example 4 (CE 4)

Yellow decoration coloring substances were prepared which comprise a rutile pigment (Sicotan 1010 by Bayer AG) with $d_{50}$=1.02 μm, $d_{90}$=2.0 μm and a density of 4.5 g/cm$^3$. The table below lists data analogous to Example 1.

|   | E 4 | CE 4 |
|---|---|---|
| PVC (%) | 30 | 30 |
| Flux: Type | A | D |
| HSP (° C.) | 810 | 450 |
| Density (g/cm$^3$) | 2.47 | 7.78 |
| Dishwasher resistance *) | 5 / 5 | 4.5 / 4.5 |
| Abrasion test *) | 5 / 5 | 4.5 / 3 |

*) Firing at 1140, and 1220° C.

The comparison shows that even a flux with a very low value for HSP does not reduce the occurrence of abrasion traces if the density is above the limit value according to the invention.

Example 5 (E 5) and Comparison Example 5 (CE 5)

Blue-green decorations were prepared which comprise as the pigment a spinel (No. 21575 by Cerdec AG) with $d_{50}$=1.4 μm, $d_{90}$=3.8 μm and a density of 5.2 g/cm$^3$. The table below shows data analogous to Example 1.

|   | E 5 | CE 5 |
|---|---|---|
| PVC (%) | 10 | 10 |
| Flux: Type | C | G |
| HSP (° C.) | 820 | 940 |
| Density (g/cm$^3$) | 2.53 | 2.51 |
| Dishwaster resistance *) | 3 / 3 | 2 / 2 |
| Abrasion test *) | 3 / 3 | 2 / 2 |

*) Firing at 1140, and 1220° C.

We claim:

1. A process for production of decorated ceramic material having high resistance to cutlery abrasion traces, whereby no abrasion traces are formed on the ceramic material or abrasion traces which are formed can essentially be wiped away, which process comprises applying to ceramic material a decoration coloring substance comprising (1) a pigment having an average grain diameter $d_{50}$ equal to or less than 2 μm and (2) a glass flux having a density equal to or less than 2.6 g/cm$^3$ and a hemisphere temperature of less than 930° C.; and firing the resultant ceramic material at 1000 to 1250° C.

2. The process as claimed in claim 1, wherein the ceramic material is tableware.

3. The process as claimed in claim 2, wherein the tableware is made of earthenware, bone china or porcelain.

4. The process as claimed in claim 1, wherein the glass flux has a hemisphere temperature equal to or less than 880° C.

5. The process as claimed in claim 1, wherein the ceramic material is glazed porcelain and the firing is at 1100 to 1250° C.

6. The process as claimed in claim 4, wherein the ceramic material is glazed porcelain and the firing is at 1100 to 1250° C.

* * * * *